United States Patent [19]
Pauquet et al.

[11] Patent Number: 5,298,540
[45] Date of Patent: Mar. 29, 1994

[54] PROCESS FOR STABILIZING RECYCLED MIXED PLASTICS

[75] Inventors: Jean-Roch Pauquet, Kaiseraugst; Franciszek Sitek, Therwil; Roberto Todesco, Allschwil, all of Switzerland

[73] Assignee: Ciba-Geigy Corporation, Ardsley, N.Y.

[21] Appl. No.: 856,238

[22] Filed: Mar. 25, 1992

[30] Foreign Application Priority Data

Mar. 27, 1991 [CH] Switzerland .................. 937/91-7

[51] Int. Cl.$^5$ .................. C08K 5/34; C08K 5/13; C08K 5/53
[52] U.S. Cl. .................. 524/94; 524/126; 524/128; 524/147; 524/151; 524/153; 524/155; 524/227; 524/239; 524/291; 524/359; 521/40
[58] Field of Search .............. 524/291, 126, 128, 151, 524/153, 147, 94, 155, 227, 359; 525/239; 521/40.5, 41.5, 42, 42.5, 43, 44

[56] References Cited

U.S. PATENT DOCUMENTS

| | | | |
|---|---|---|---|
| 4,302,555 | 11/1981 | Falk | 525/239 |
| 4,423,174 | 12/1983 | Minagawa et al. | 524/147 |
| 4,885,326 | 5/1989 | Haruna et al. | 524/291 |
| 4,912,156 | 3/1990 | Yagi et al. | 524/291 |
| 4,987,166 | 1/1991 | Jacono et al. | 524/68 |

FOREIGN PATENT DOCUMENTS

| | | |
|---|---|---|
| 0115885 | 8/1984 | European Pat. Off. . |
| 0243761 | 11/1987 | European Pat. Off. . |
| 0336606 | 10/1989 | European Pat. Off. . |
| 0039455 | 3/1979 | Japan . |
| 1103954 | 5/1986 | Japan . |
| 1127744 | 6/1986 | Japan . |
| 3006039 | 1/1988 | Japan . |

OTHER PUBLICATIONS

"Polymer Blends", vol. 1, pp. 52-113, Ed. by Paul et al. Academic Press, N.Y.
Industrie Anzeiger Bd. 99, No. 71, 1977, 1367-1369.
C.A. 106(2): 6344u (Jan. 1987).
Derwent 89-321388 (1989).
Conf. Int. Trade Fair Recycling Refuse Collect. Waste Treat. Elmia-Avfall 79 1979, 657-667.
Polym. Plast. Technol. Eng. 24(2 & 3), 149-185 (1985).
Polym. J. vol. 18, pp. 1007-1010, 1982.

*Primary Examiner*—Paul R. Michl
*Assistant Examiner*—Tae H. Yoon
*Attorney, Agent, or Firm*—Luther A. R. Hall

[57] ABSTRACT

Recycled mixed plastics from domestic and commercial waste can be stabilized against thermal oxidative degradation by adding a combination of a sterically hindered phenol with a phosphite or phosphonite.

13 Claims, No Drawings

PROCESS FOR STABILIZING RECYCLED MIXED PLASTICS

The present invention relates to a process for stabilising recycled mixed plastics recovered from domestic and commercial waste.

The recycling of waste products is a problem which is steadily gaining in importance for ecological reasons. The recycling of paper, textiles, glass and metals is already being carried out on a large scale, whether by separate collection or by sorting the waste material. The reuse of waste plastics is basically possible, provided the waste consists of thermoplastic polymers. The waste plastics generated in the domestic and commercial sectors is essentially packaging material and consists almost exclusively of thermoplastic polymers, largely of polyolefins, styrene polymers and polyvinyl chloride.

Whereas sorting the plastics waste from other waste is technically and economically feasible, sorting out the individual types of plastics is immensely troublesome. The reuse of plastics waste from domestic waste virtually means utilising a blend of different types of plastics materials. The technical problems involved are great, as the individual types of plastics can only be blended to a limited degree or not at all. Although different types of thermoplastic polymers can be processed by melting and shaping, the polyblends thereby obtained of incompatible plastics are microscopically inhomogeneous, i.e. they consist microscopically of different solid phases. This brings about a sharp reduction in the mechanical properties, so that such recycled materials can only be used for purposes for which the strength properties need fulfill only low criteria, typically for sound-insulating walls or fillers.

Typical combinations of incompatible components which occur in domestic waste are polyethylene and PVC or polyethylene and polystyrene. To solve this problem the proposal has been made to add polymer components known as "solid phase dispersants" or "compatibilisers". Thus the addition of chlorinated polyethylene is able to homogenise blends of polyethylene and PVC. The addition of styrene-butadiene copolymer is able to homogenise blends of polyolefins and polystyrene. As a result of this homogenisation, the mechanical properties increase so substantially that such polyblends are also suitable for high-quality applications. An overview of these developments has been provided by C. Sadrmohaghegh, G. Scott and E. Setudeh in Polym. Plast. Technol. Eng. 24 (1985), 149–185.

These authors point that the recycled plastics need to be freshly stabilized. Although stabilisers for inhibiting thermal oxidative and, in some cases, photo-oxidative, degradation were originally incorporated in the plastics materials, some of these stabilisers have been lost through migration, extraction or degradation in the course of the useful life of the plastics and during storage of the plastics waste. Moreover, a recycled plastics material needs a higher concentration of stabilisers than a virgin polymer, as sites of attack for oxidative degradation will have already formed.

The stabilisation of mixed plastics is a difficult task, as each type of polymer makes specific demands of the stabilisers. Hence the stabilisers used for vinyl chloride polymers are quite different from those used for polyolefins or styrene polymers.

It would therefore to necessary to add a combination of different stabilisers to stabilise mixed plastics. This is a complicated procedure when complex polyblends are to be stabilized. Moreover, different stabilisers can affect each other adversely, or a stabiliser for one component can be deleterious to the other.

In the reference cited above and in Europ. Polym. J. 18 (1982), 1007, this problem too is investigated and the authors come to the conclusion that specific nickel complexes, especially nickel dialkyldithiocarbamates, effect the best stabilisation against thermal oxidative and photo-oxidative degradation of polyblends of polyethylene/polystyrene and polyethylene/polypropylene which are homogenised with a compatibiliser. No mention is made in these publications of the stabilisation of recycled products which also contain PVC.

It has now been found that such polyblends can be stabilized against thermal oxidative degradation in simple and economic manner with a combination of two known stabilisers.

Specifically, the invention relates to a process for stabilising recycled mixtures of thermoplastic polymers which are recovered from domestic and commercial waste, which comprises incorporating in said mixtures 0.05 to 2% by weight of a combination of a) at least one sterically hindered phenol and b) at least one phosphite or phosphonite.

The mixed plastics to be stabilized are waste products recovered from waste generated in the domestic and commercial sectors (e.g. from supermarkets) and mainly consisting of packaging material. The waste products may be sheets, bags, bottles and other containers or foamed plastics. They may also comprise toys or other articles of everyday use. Plastics waste generated in the plastics manufacturing or processing industry, and usually containing only one type of plastic, does not fall within the scope of this invention.

In particular, the invention relates to the stabilisation of those recycled mixed plastics which comprise 55–75% by weight of polyolefins, 5–25% by weight of polystyrene, 5–15% by weight of polyvinyl chloride and 0–10% by weight of other thermoplastic polymers.

Among the polyolefins, polyethylene usually predominates, especially low-density polyethylene. Polystyrene will be understood as meaning copolymers which contain a preponderance of styrene; and polyvinyl chloride will also be understood as meaning copolymers containing a preponderance of vinyl chloride. Other thermoplastic polymers present in the waste are essentially polyethylene terephthalate, in addition to polyamides, polycarbonate, cellulose acetate and polyvinylidene chloride. Plastics waste may also contain minor amounts of foreign matter, typically paper, pigments and adhesives, which are often difficult to remove. Insignificant amounts of cellulose or fibrous materials do not interfere with the recycling.

It is preferred to incorporate 0.1 to 0.5% by weight of the mixture of a) and b). The preferred weight ratio of a:b is 10:1 to 1:10, especially preferred is a weight ratio of 5:1 to 1:5.

The sterically hindered phenols used as component a) are known stabilisers for inhibiting the thermal oxidative ageing of plastics materials, especially of polyolefins. These compounds preferably contain at least one group of formula

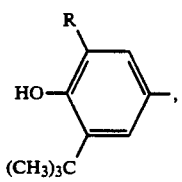

(I)

wherein R is hydrogen, methyl or tert-butyl.

Representative examples of such sterically hindered phenols are:

2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, 2,6-dinonyl-4-methylphenol, 2,6-di-tert-butyl-4-methoxyphenol, 2,5-di-tert-butylhydroquinone, 2,5-di-tert-amyl-hydroquinone, 2,6-diphenyl-4-octadecyloxyphenol, 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl)butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4-methylphenyl]terephthalate, 1,3,5-tris(3,5-di-tert-butyl-4-hydroxybenzyl)-2,4,6-trimethylbenzene, bis(3,5-di-tert-butyl-4-hydroxybenzyl)sulfide, isooctyl 3,5-di-tert-butyl-4-hydroxybenzylmercaptoacetate, bis(4-tert-butyl-3-hydroxy-2,6-dimethylbenzyl)dithiolterephthalate, 1,3,5-tris-(3,5-di-tert-butyl-4-hydroxybenzyl)isocyanurate, 1,3,5-tris(4-tert-butyl-3-hydroxy-2,6-dimethylbenzyl)isocyanurate, dioctadecyl 3,5-di-tert-butyl-4-hydroxybenzylphosphonate, and the calcium salt of monoethyl 3,5-di-tert-butyl-4-hydroxybenzylphosphonate.

Most preferably, component a) is selected from compounds which contain at least one group of formula

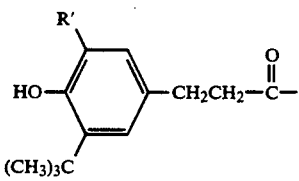

(II)

wherein R' is methyl or tert-butyl.

Typical examples of such hindered phenols are the esters of β-(3,5-di-tert-butyl-4-hydroxyphenyl)propionic acid and of β-(5-tert-butyl-4-hydroxy-3-methylphenyl)propionic acid with monohydric or polyhydric alcohols, as with methanol, octadecanol, 1,6-hexanediol, neopentyl glycol, thiodiethylene glycol, diethylene glycol, triethylene glycol, pentaerythritol, tris(hydroxyethyl) isocyanurate, N,N'-bis(hydroxyethyl)oxamide, and the amides of these acids, for example N,N'-bis(3,5-di-tert-butyl-4-hydroxyphenylpropionyl)hexamethylenediamine, N,N'-bis(3,5-di-tert-butyl-4-hydroxyphenylpropionyl)trimethylenediamine and N,N'-bis(3,5-di-tert-butyl-4-hydroxyphenylpropionyl)-hydrazine.

Most preferably, component a) is the pentaerythritol ester and the octadecyl ester of β-(3,5-di-tert-butyl-4-hydroxyphenyl)propionic acid.

The phosphites and phosphonites used as component b) are also known stabilisers for plastics. They are used in particular as processing stabilisers for polyolefins.

The phosphites and phosphonites useful as component b) are predominantly aromatic phosphites and phosphonites. Typical examples are triphenyl phosphite, diphenylalkyl phosphites, phenyldialkyl phosphites, tris(nonylphenyl) phosphite, trilauryl phosphite, trioctadecyl phosphite, distearyl pentaerythritol diphosphite, tris(2,4-di-tert-butylphenyl)phosphite,distearyl) pentaerythritol diphosphite, bis(2,4-di-tert-butylphenyl)pentaerythritol diphosphite, tristearyl sorbitol triphosphite, tetrakis(2,4-di-tert-butylphenyl)-4,4'-biphenylene diphosphonite, 3,9-bis(2,4-di-tert-butyl-4-methylphenoxy)-2,4,8,10-tetraoxa-3,9-diphosphaspiro[5.5]undecane, 3,9-tris(2,4,6-tris-tert-butylphenoxy)-2,4,8,10-tetraoxa-3,9-diphosphaspiro[5,5]undecane and 2,2'-ethylidenebis(4,6-di-tert-butylphenyl)fluorophosphite.

It is especially preferred to use tetrakis(2,4-di-tert-butylphenyl)-4,4'-biphenylene diphosphonite, tris(2,4-di-tert-butylphenyl) phosphite or tris(4-nonylphenyl) phosphite as component b).

Combinations of phenolic antioxidants with phosphites are known stabilisers for polyolefins, q.v. Gächter, Müller/Kunststoff-Additive (Plastics Additives), C. Hanser-Verlag 1983, pages 1-78, especially pages 22-41. It is, however, novel and surprising that such combinations are also suitable for blends of polyolefins with styrene and vinyl chloride polymers.

The incorporation of these combinations in the recycled plastics material makes thermoplastic processing possible with reduced degradation and prolongs the useful life of the products fabricated from the recycled plastics material. This applies irrespective of whether a compatibiliser is added to the recycled plastics material or not. The addition of the combination of a) and b) is, however, of special significance for recycled plastics to which a polymer or polymer blend which enhances the compatibility of the individual components for each other is added, because this polymer too needs to be stabilised.

These compatibilisers may be copolymers, preferably block copolymers, of styrene with butadiene and, in some cases, acrylonitrile. They may be copolymers of ethylene and propylene and an optional third monomer component, such as butadiene.

Suitable compatibilisers are also chlorinated polyethylene or ethylene-vinyl acetate copolymers, although naturally this depends on the composition of the respective recycled plastics material.

These polymer compatibilisers are normally used in amounts of 3–20% by weight, based on the mixed plastics.

The stabilising effect of the combination of a) and b), especially the long-term stability, can be enhanced synergistically by the addition of so-called thiosynergists. These are aliphatic thioethers, or especially esters of thiodipropionic acid. Typical examples of such thiosynergists are the lauryl, stearyl, myristyl or tridecyl ester of thiodipropionic acid or distearyl disulfide. These thiosynergists are preferably used in an amount of 0.1 to 0.6% by weight, based on the recycled plastics material.

If the object fabricated from the recycled plastics material must also meet the criterion of superior light stability, then it is advisable to add one or more light stabilisers, most suitably those of the series of the benzophenones, benzotriazoles, oxalanilides and the sterically hindered amines. Representative examples of such compounds are:

2-Hydroxybenzophenones, for example the 4-hydroxy, 4-methoxy, 4-octyloxy, 4-decyloxy, 4-dodecyloxy, 4-benzyloxy, 4,2',4'-trihydroxy, 2'-hydroxy-4,4'-dimethoxy derivative.

2-(2'-Hydroxyphenyl)benzotriazoles, for example the 5'-methyl, 3',5'-di-tert-butyl, 5'-tert-butyl, 5'-(1,1,3,3-tetramethylbutyl), 5-chloro-3',5'-di-tert-butyl, 5-chloro-3'-tert-butyl-5'-methyl, 3'-sec-butyl-5'-tert-butyl, 4'-octyloxy, 3',5'-di-tert-amyl, 3',5'-bis($\alpha,\alpha$-dimethylbenzyl) derivative.

Oxamides, for example 4,4'-dioctyloxyoxanilide, 2,2'-dioctyloxy-5,5'-di-tert-butoxanilide, 2,2'-didodecyloxy-5,5'-di-tert-butoxanilide, 2-ethoxy-2'-ethyl-oxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-substituted oxanilides as well as of o- and p-ethoxy-disubstituted oxanilides.

Sterically hindered amines, for example bis(2,2,6,6-tetramethylpiperidyl) sebacate, bis(1,2,2,6,6-pentamethylpiperidyl) sebacate, bis(1-octyloxy-2,2,6,6-tetramethyl-4-piperidyl) sebacate, the bis(1,2,2,6,6-pentamethylpiperidyl) ester of n-butyl-3,5-di-tert-butyl-4-hydroxybenzylmalonic acid, the condensate of 1-hydroxyethyl-2,2,6,6-tetramethyl-4-hydroxypiperidine and succinic acid, the condensate of N,N'-bis(2,2,6,6-tetramethyl-4-piperidyl)hexamethylenediamine and 4-tert-octylamino-2,6-dichloro-1,3,5-s-triazine or 4-morpholino-2,6-dichloro-1,3,5-triazine, tetrakis(2,2,6,6-tetramethyl-4-piperidyl)-1,2,3,4-butanetetraoate, bis(2,2,6,6-tetramethylpiperidyl) succinate, N-(1,2,2,6,6-pentamethyl-4-piperidyl)-α-dodecylsuccinimide, N-(2,2,6,6-tetramethyl-4-piperidyl)-α-dodecylsuccinimide, 2,4,6-tris[N-pentyl-2-(3,3,5,5-tetramethyl-2-oxopiperazino)ethylamino]-1,3,5-triazine, 2,2,4,4-tetramethyl-7-oxa-3,20-diaza-21-oxo-dispiro[5,1,11,2-]heneicosane, 2,2,4,4-tetramethyl-20-(2-dodecyloxycarbonylethyl)-7-oxa-3,20-diaza-21-oxo-dispiro[5,1,11,2-]heneicosane, 8-acetyl-3-dodecyl-1,3,8-triaza7,7,9,9-tetramethyl-spiro[4,5]decane-2,4-dione, 1,5,8,12-tetrakis[2,4-bis(N-butyl-1,2,2,6,6-pentamethyl-4-piperidylamino)-1,3,5-triazin-6-yl]-1,5,8,12-tetraazadodecane as well as polysiloxanes which contain 2,2,6,6-tetramethyl-4-piperidinyl groups.

The light stabilisers are preferably incorporated in an amount of 0.01 to 2% by weight, more particularly 0.05 to 0.5% by weight, based on the mixed plastics. The preferred light stabiliser is a combination of a benzotriazole and a sterically hindered amine.

If necessary, further customary additives for plastics can be incorporated in the recycled mixed plastics, conveniently fillers, reinforcing agents, pigments, plasticisers, lubricants, flame retardants, antistatic agents or blowing agents. Such additives will depend on the envisaged use of the recycled plastics material.

The stabilised recycled plastics can be used for a wide variety of purposes, typically for pipes, profiles, boards, cable insulations, sports equipment, garden furniture, building components, vehicle components and machine parts, and containers of all kinds.

The invention is illustrated by the following Examples in which parts and percentages are by weight.

EXAMPLE 1

A mixture of recycled plastics comprising c. 72% of polyolefins (of which c. 80% is polyethylene), c. 18% of polystyrene, c. 7% of polyvinyl chloride and c. 3% of other polymers is ground in a shredder. After addition of the stabilisers listed in Table 1, the polymer is fused in a Brabender plastograph at 200° C. and homogenised. The melt is then compressed to 2 mm sheets at 200° C.

These sheets are subjected to artificial ageing in a forced-draught oven at 110° C. until the onset of embrittlement. Table 1 indicates the time taken to embrittlement as an indicator of stabilisation.

The following stabilisers are used:
AO-1 -pentaerylthrityl β-(3,5-di-tert-butyl-4-hydroxyphenyl)propionate
P-1 tris(2,4-di-tert-butylphenyl)phosphite

TABLE 1

| Stabiliser | Days to embrittlement at 110° C. |
|---|---|
| none | 18 |
| 0.05% AO-1 + 0.5% P-1 | 58 |
| 0.05% AO-1 + 0.2% P-1 | 55 |
| 0.05% AO-1 + 0.2% P-1 +6% of Bennet ® GR10*) | 111 |

*)Bennet ® GR10 = compatibiliser based on an ethylene-propylene copolymer

EXAMPLE 2

A mixture of recycled plastics comprising c. 70% of polyolefins, c. 20% of polystyrene, c. 7% of polyvinyl chloride and c. 3% of other polymers is ground in a shredder. After addition of the stabilisers listed in Table 2, the polymer is extruded at 190° C. in a twin-screw extruder. Strips measuring 1.5×10×0.5 cm are cut from the profiles so obtained.

These strips are subjected to artificial ageing in a forced-draught oven at 110° C. until the onset of embrittlement. Table 2 indicates the time taken to embrittlement as an indicator of stabilisation.

The following stabilisers are used:
AO-1 pentaerythrityl β-(3,5-di-tert-butyl-4-hydroxyphenyl)propionate
P-1 tris(2,4-di-tert-butylphenyl)phosphite
T-1 distearyl thiodipropionate
L-1 2-(2'-hydroxy-3',5'-di-tert-butylphenyl)-5-chlorobenzotriazole
L-2 bis(2,2,6,6-tetramethyl-4-piperidyl) sebacate

TABLE 2

| Stabiliser | Days to embrittlement at 110° C. |
|---|---|
| none | 43 |
| 0.03% AO-1 + 0.06% P-1 +0.1 T-1 | 270 |
| 0.05% AO-1 + 0.1% P-1 | >270 |
| 0.05% AO-1 + 0.1% P-1 +0.3% L-1 | >270 |

TABLE 2-continued

| | |
|---|---|
| 0.05% AO-1 + 0.1% P-1 +0.15% L-1 + 0.3% L-2 | >270 |
| 0.05% AO-1 + 0.1% P-1 +0.3% L-2 | >270 |

EXAMPLE 3

A mixture of recycled plastics comprising c. 70% of polyolefins, c. 20% of polystyrene, c. 7% of polyvinyl chloride and c. 3% of other polymers is ground in a shredder. After addition of the stabilisers listed in Table 3, the polymer is extruded at 190° C. in a twin-screw extruder. Strips measuring 1.5×4×0.5 cm are cut from the profiles so obtained.

These strips are hung in a Weather-O-meter (black standard temperature c. 63° C., rel. humidity c. 60%, dry cycle). After artificial weathering for 6000 hours, the retained impact strength is measured in a Zwick impact tester using samples measuring 1.5×4×0.5 cm cut from the profiles. The impact strength computed therefrom is reported in Table 3.

AO-1 pentaerythrityl β-(3,5-di-tert-butyl-4-hydroxyphenyl)propionate
P-1 tris(2,4-di-tert-butylphenyl)phosphite
L-1 2-(2'-hydroxy-3',5'-di-tert-butylphenyl)-5-chlorobenzotriazole
L-2 bis(2,2,6,6-tetramethyl-4-piperidyl) sebacate

TABLE 3

| Stabiliser | Retained impact strength (%) |
|---|---|
| none | 42 |
| 0.05% AO-1 + 0.1% P-1 | 62 |
| 0.05% AO-1 + 0.1% P-1 +0.3% L-1 | 71 |
| 0.05% AO-1 + 0.1% P-1 +0.3% L-2 | 67 |

What is claimed is:

1. A process for stabilising a recycled mixture of thermoplastic polymers recovered from domestic and commercial waste, which mixture comprises 55–75% by weight of polyolefins, 5–25% by weight of polystyrene, 5–15% by weight of polyvinyl chloride and 0–10% by weight of other thermoplastic polymers, which process comprises
incorporating in said mixture 0.05 to 2% by weight, based on the weight of the mixture, of a combination of (a) at least one sterically hindered phenol, and (b) at least one phosphite or phosphonite, wherein the weight ratio of (a):(b) is 10:1 to 1:10.

2. A process according to claim 1, which comprises incorporating 0.1 to 0.5% by weight of the combination of a) and b) in the mixed polymers.

3. A process according to claim 1, wherein component a) is a compound which contains a group of formula

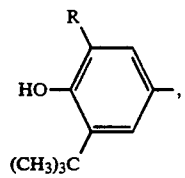

wherein R is hydrogen, methyl or tert-butyl.

4. A process according to claim 1, wherein component a) is a compound which contains at least one group of formula

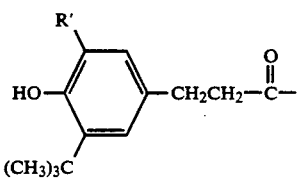

wherein R' is methyl or tert-butyl.

5. A process according to claim 1, wherein component a) is the pentaerythritol ester or the octadecyl ester of β-(3,5-di-tert-butyl-4-hydroxyphenyl)propionic acid.

6. A process according to claim 1, wherein component b) is tetrakis(2,4-di-tert-butylphenyl)-4,4'-biphenylene diphosphonite, tris(2,4-di-tert-butylphenyl)phosphite or tris(4-nonylphenyl)phosphite.

7. A process according to claim 1, wherein the mixed polymers additionally comprise a polymer or polymer blend which enhances the compatibility of the individual plastic components.

8. A process according to claim 7, the compatibiliser is used in an amount of 3–20% by weight, based on the mixed polymers.

9. A process according to claim 1, which comprises adding to the mixed polymers a thiosynergist of the series of the esters of thiopropionic acid.

10. A process according to claim 9, wherein the amount of thiosynergist is 0.1 to 0.6% by weight, based on the recycled mixed polymers.

11. A process according to claim 1, which comprises additionally incorporating in the recycled polymers material at least one light stabiliser of the series of the benzophenones, benzotriazoles, oxanalides or sterically hindered amines.

12. A process according to claim 11, wherein the amount of light stabiliser or stabilisers is 0.01 to 2% by weight, based on the mixed polymers.

13. A process according to claim 11, which comprises incorporating a light stabiliser of the series of the benzotriazoles and a light stabiliser of the series of the sterically hindered amines.

* * * * *